July 27, 1948.  H. O. SPILLER  2,446,113
FASTENING DEVICE FOR DETACHABLY CONNECTING
TOGETHER TWO RELATIVELY MOVABLE PARTS
Filed Nov. 7, 1945  3 Sheets-Sheet 1

INVENTOR
HERBERT O. SPILLER
BY
Emery Holcombe & Blair
ATTORNEY

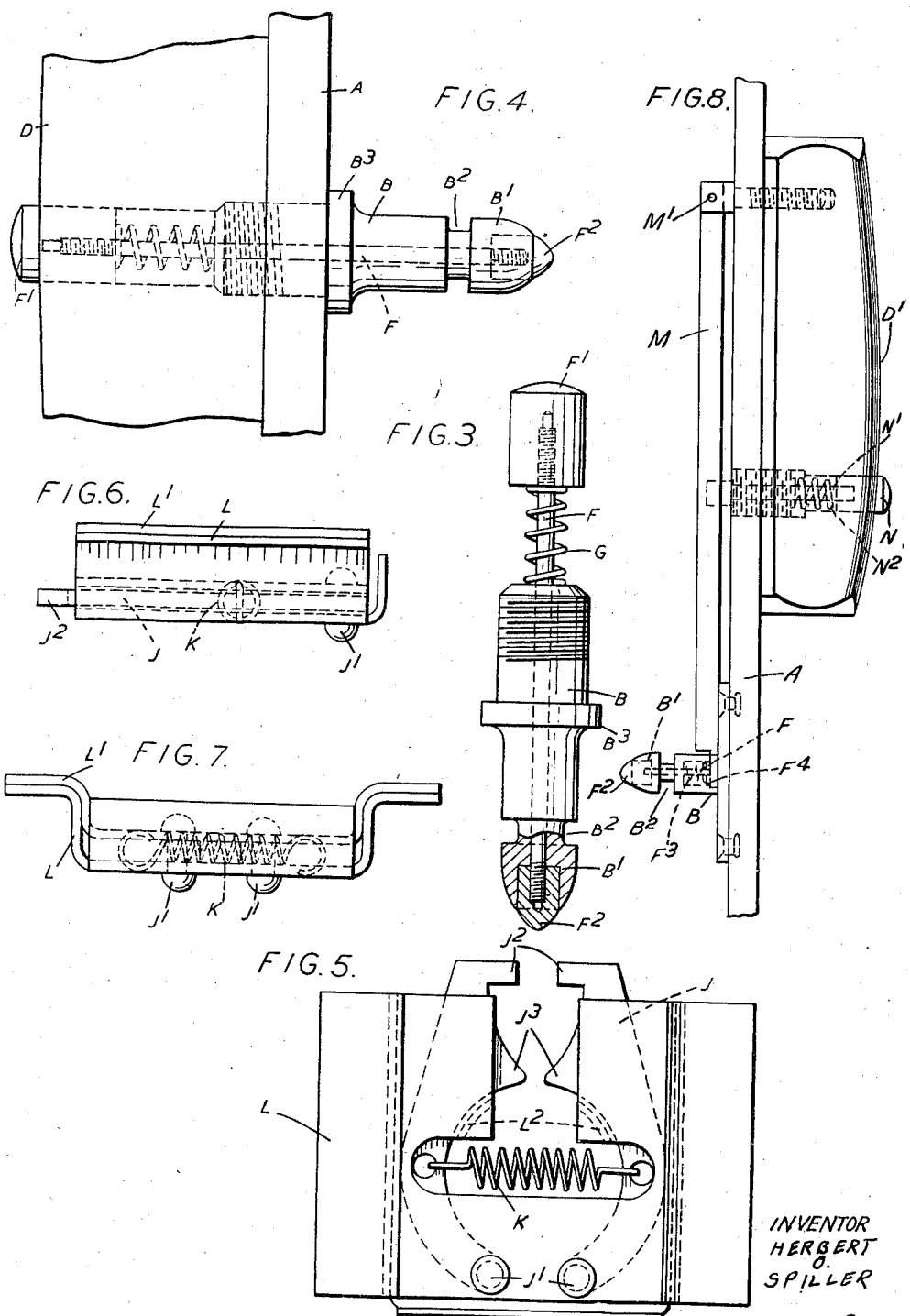

July 27, 1948. H. O. SPILLER 2,446,113
FASTENING DEVICE FOR DETACHABLY CONNECTING
TOGETHER TWO RELATIVELY MOVABLE PARTS
Filed Nov. 7, 1945 3 Sheets-Sheet 3
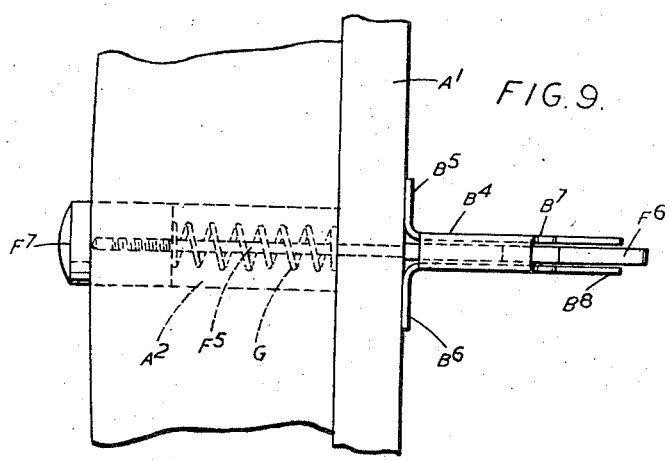
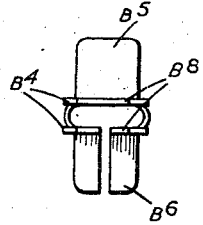
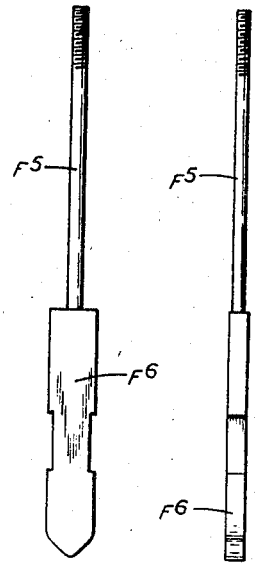
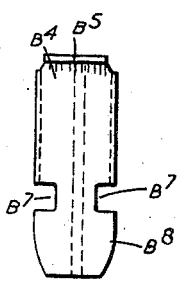
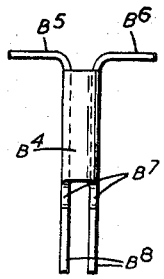
INVENTOR
HERBERT O. SPILLER
BY
Emery, Holcombe & Blair
ATTORNEY Patented July 27, 1948

2,446,113

UNITED STATES PATENT OFFICE 2,446,113

FASTENING DEVICE FOR DETACHABLY CONNECTING TOGETHER TWO RELATIVELY MOVABLE PARTS

Herbert Owen Spiller, Wootton, Isle of Wight, England, assignor to J. Samuel White & Company Limited, Isle of Wight, Hampshire, England, a company of Great Britain Application November 7, 1945, Serial No. 627,247
In Great Britain November 27, 1944

3 Claims. (Cl. 292—30)

This invention relates to fastening devices for detachably connecting together two relatively movable parts and is more especially intended for use as a fastening for a door, lid of a box, drawer or like member which is hinged or otherwise mounted on or can slide in relation to another member. The invention has for its object to provide a fastening which will engage and hold the two parts whether they are brought together or closed gently or violently while enabling them to be easily and quickly disconnected.

Fastening devices for this purpose may be of the type which comprise a fixed projection mounted on the first of the two parts, a head with a reduced part behind it at the end of this fixed projection, and two similar jaws mounted on the second of the two parts, each jaw being pivoted at one end and having a tooth-like portion on the other end adapted first to pass over the head and then automatically to engage the reduced part of the fixed projection when the two relatively movable parts are brought together. It is with fastening devices of this type that the invention is concerned. In such devices it has generally been the practice to provide mechanism for releasing the fixed projection from the jaws by opening the jaws, such mechanism being mounted on the part which carries the jaws. It is an object of this invention, on the other hand, to provide a device in which the mechanism for opening the jaws is mounted on the part which carries the fixed projection. A further object of the invention is to provide a mechanical mechanism for this purpose which is simple, cheap and neat in appearance. Arrangements hitherto proposed in which the jaw releasing mechanism has been mounted on the part which carries the fixed projection have been complicated, for example it has been proposed to operate the mechanism by compressed air. Such arrangements are unsuitable for ordinary domestic and similar purposes where there may not be a convenient supply of compressed air.

According to this invention in a fastening device of the type referred to there is combined a rod which passes longitudinally through and which can slide in the fixed projection, a spring operative to cause sliding of the rod in the outward direction (i. e. in the direction opposite to that in which the movable parts are brought together), a formation on the inner end of the rod which extends beyond the head of the projection when the rod is pushed inwards against the action of the spring, and a formation on each of the jaws intermediate between the pivot and the tooth-like portion adapted to be engaged by the formation on the inner end of the rod when the latter is moved inwards to move apart the jaws to disengage the reduced part of the fixed projection.

While, as indicated, the improved fastening may be employed for various purposes, it is particularly adapted for use as a fastening for the door of a cupboard and as designed for such use and by way of example it is illustrated in the accompanying drawings, in which—

Figure 3 is an elevation of the fixed projection the end thereof being shown in longitudinal section.

Figure 4 is a side elevation showing this fixed projection as when mounted on the door of a cupboard.

Figure 5 is an elevation showing the locking jaws as when assembled for mounting in a cupboard or elsewhere.

Figure 6 shows the assembly of these locking jaws as seen from the right-hand in Figure 5.

Figure 7 is an end elevation of the assembly of the locking jaws as seen from the rear.

Figure 8 is an elevation showing the fixed projection mounted as on the door of a cupboard and arranged in a position where release of the fastening can be effected indirectly and not by applying pressure directly to the sliding pin.

Figure 9 is an elevation showing an alternative construction of the fiixed projection and sliding pin in which the projection is flat instead of circular in cross-section and the sliding pin is also flat.

Figures 10 and 11 show in elevation this sliding pin as viewed in two aspects at right angles to each other.

Figures 12 and 13 similarly show the flat fixed projection as seen from points at right angles to each other.

Figure 14 is a view of this projection as seen from the end.

Figure 1:
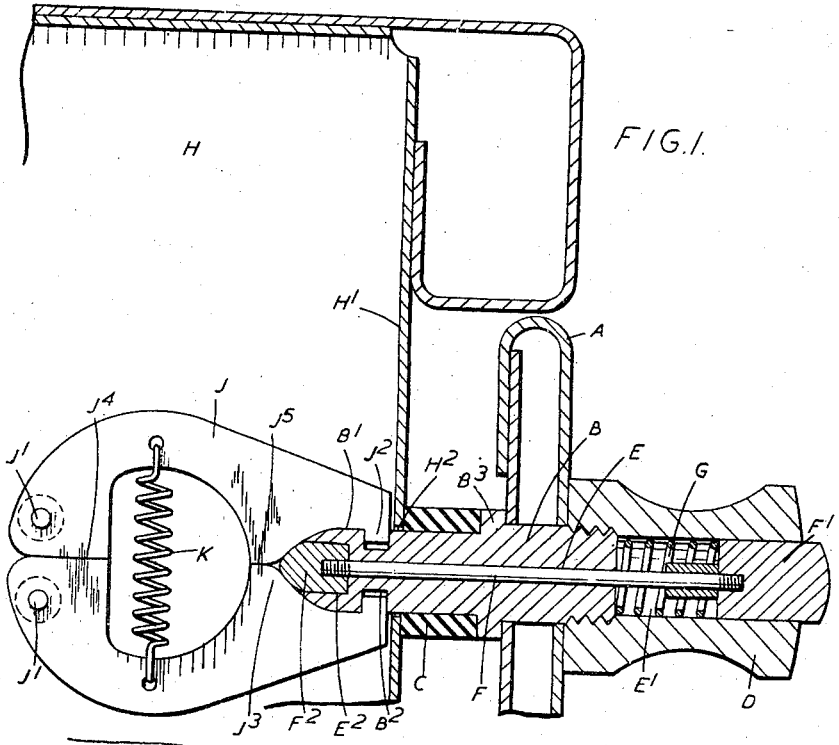
Figure 1 is a sectional elevation of the complete fastening as arranged with the locking jaws mounted within a cupboard and the fixed projection carried on the door of the cupboard, the parts in this figure being shown in engagement, that is with the door fastened.
Figure 2:
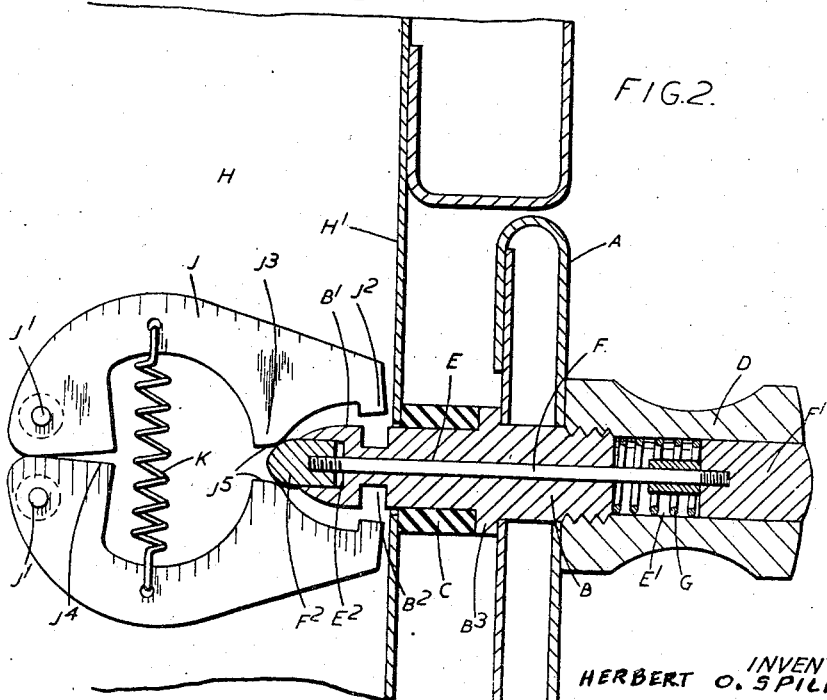
Figure 2 is a view similar to Figure 1 in which the sliding pin is shown as pushed in so as to release the fastening.

Referring to Figures 1 to 7, the fixed projection is shown in Figures 1 and 2 as mounted on the inner face of a door A and conveniently near its edge with the axis of the projection extending approximately at right angles to the general plane of the inner surface of the door. The projection comprises a main part or body B and a head B¹ these parts being circular in cross-section and having between them an annular groove B² forming a neck behind the head. The head is dome-shaped and on the exterior of the body B is a shoulder B³ and between this and the neck B² is a ring or thick sleeve C formed of rubber or like resilient substance which serves as a shock absorber when the door is closed. The opposite side of this shoulder B³ comes against the inner face of the door, as may be seen in Figures 1 and 2, when the body B of the projection is passed through a hole in the door and the threaded end screwed into a hole in a handle D of suitable form whereby the projection is fixed in place.

A central hole E runs through the body B of the projection throughout its length and in this hole lies and can slide a pin F which carries on its outer end a button F¹ or other formation suitable for the application thereto of pressure when the fastening is to be released. The button can slide in a hole E¹ in the handle and between the inner end of the button and the outer end of the body B lies a coiled spring G which thus tends to push the button outwards and with it the pin F. At the opposite or inner end of the sliding pin F is an enlargement or boss F² having a rounded face and this boss lies and can slide in a recess E² at the end of the hole E and in the head B¹ of the projection. When retracted by the action of the spring G and in the position in which the parts are shown in Figure 1 this boss lies almost wholly within the head B¹ and the end of the boss forms a rounded nose and gives a smooth and rather pointed front to the head. When pressure is applied to the button F¹ the enlargement will be caused to project beyond the head B¹ as shown in Figure 2.

The two locking members are similar and are pivotally mounted on some fixed part within the cupboard as for instance on the side wall H and in a position where they can engage the head of the projection B when the door A which carries this projection is closed. Each locking member is constituted by a lever J pivoted at one end at J¹ these pivots being near to each other and their axes parallel so that both the levers lie and move in a plane which will contain the axis of the projection B when the door A of the cupboard is closed. A coiled spring K connects the two levers J and causes them to move towards each other. The end of each lever remote from its pivot is formed with a tooth-like projection J² shaped so that it can enter into and engage the recess or neck B² behind the head B¹ of the projection B, and at an intermediate place in the length of the lever J is a projecting part J³, what may be called the edge of the lever between the projection J³ and the tooth J² being given a contour which corresponds to the contour of the head B¹ and the boss F² on the end of the sliding pin F when the latter is in its normal position of rest as seen in Figure 1. Thus as can be seen in this figure when the head B¹ of the projection B is engaged by the locking levers J the edges of the two levers will lie close to the surface of the head B¹ and the rounded nose F² which will be substantially in contact with the projecting parts J³ of the two levers. If now the button F¹ be pushed inwards causing the boss F² on the end of the pin F to protrude from the head B¹, the two levers J will be forced apart against the action of the spring K in the manner shown in Figure 2 and the teeth J² will be withdrawn from the neck B² so that the catch will be released and the door can be opened.

In the construction of levers J shown in Figures 1 and 2 it will be seen that each lever is provided with a flat part J⁴ at its edge near the pivot J¹ and another flat part J⁵ at the end of the projection J³. These flat portions on the two levers abut as can be seen in Figure 1 when the levers are in engagement with the projection B and of course similarly when the levers have been disengaged and the head B¹ of the projection B is not between the levers. These abutting parts limit the extent to which the levers can be drawn together by the spring K and maintain a gap between the jaws J² into which the head B¹ of the projection and the enlargement F² therein can readily enter when the door A is closed and the projection forced against the ends of the levers J. The opening out of the levers will then be ensured so that the head of the projection can enter the gap between and the locking be effected. Conveniently the locking levers when mounted on the side wall H of the cupboard lie behind a flange or the like H¹ directed inwardly and where it will be behind the door A when this is closed. A hole H² in this flange permits the passage of the head B¹ of the projection so that it may be engaged by the locking levers. When the door is thus closed the resilient sleeve or washer C comes in contact with the part H¹ around the hole H² and deadens the shock of closing and also prevents rattling when the door is fastened. As an alternative to providing the levers J with flat parts J⁴, J⁵, the movement towards each other of these levers may be checked by stops on some fixed part. Such an arrangement is shown in Figure 5 wherein the levers J are seen as having their pivots J¹ carried between suitably shaped plates L, L¹ which can be attached by rivets or otherwise to the cupboard or other part, the plates then closing in the levers in the manner to be seen in Figures 6 and 7. In this case one of these plates L carries at its inner side two lateral projections L² constituting stops which lie in the path of the levers J and limit their movement towards each other so that there is always maintained a gap between the teeth J² for the entry of the head of the projection B. The confinement of the flat levers J between the plates L, L¹ maintains them in the plane containing the axis of the projection B so that the gap between the teeth J² will always be correctly located with respect to that axis when the door is closed.

In the arrangement shown in Figure 8 the movement necessary to release the catch by sliding the pin F is effected indirectly and not by direct pressure on the end of that pin. Here the projection B is mounted on the door or other part A and the end of the pin F is acted on by one end of a lever M pivoted at M¹. A push button N is arranged in a handle D¹ and acts upon the lever M at some point intermediate in its length. A pin N¹ runs between the push button N and the lever M and a spring N² constantly presses the button N outwards. A coiled spring F³ in a recess in the body of the projection B acts on an enlargement F⁴ on one end of the sliding pin F and thus keeps the boss F² on the end of this pin drawn back into the head B¹ of the projection. This arrangement enables the fastening device to be placed in a position where it might not be convenient to situate the push button for directly operating it.

Referring now to the modified form of the projection shown in Figures 9 to 14, it will be seen here that while the general arrangement resembles that shown in Figures 1, 2, 3 and 4 what may be called the operative part of the projection which is adapted to be engaged by the locking levers is flat in place of being circular in cross-section. The projection here comprises what may be called a body $B^4$ formed of metal pressed to the shape indicated in Figures 9, 12, 13 and 14. This body somewhat resembles a flat tube formed as a pressing from sheet metal with two oppositely directed lugs $B^5$, $B^6$ constituting flat plates which lie at right angles to the body and serve to attach it, as by welding or otherwise, to the part $A^1$ on which it is to be mounted. The two opposite sides of the body are notched as at $B^7$ to form the neck behind the head $B^8$ of the projection. The sliding pin $F^5$ carries at one end a flat strip $F^6$ which lies in the space between the sides of the flat projection $B^4$, $B^8$, the end of this flat strip being suitably rounded and forming the nose of the whole projection. The flat strip $F^6$ and the pin $F^2$ are guided by the body $B^4$ and by the push button $F^7$ as it moves in a hole $A^2$ in the door or other part $A^1$, a coiled spring $G^1$ being disposed so that it will tend to push outwards the button $F^7$ and draw into the head $B^8$ the nose of the flat strip $F^6$.

The general form of the locking members may vary according to the position in which they are to be mounted and the shape and construction of the end of the projection which is engaged by the locking members.

What I claim as my invention and desire to secure by Letters Patent is:

1. In a fastening device for detachably connecting together two relatively movable parts of the type comprising a fixed projection mounted on the first of the two parts, a head with a reduced part behind it at the end of this fixed projection, and two similar jaws mounted on the second of the two parts, each jaw being pivoted at one end and having a tooth-like portion on the other end adapted first to pass over the head and then automatically to engage the reduced part of the fixed projection when the said two relatively movable parts are brought together; the combination of a rod which passes longitudinally through and which can slide in the said fixed projection, a spring operative to cause sliding of the rod in the outward direction, a formation on the inner end of the rod which extends beyond the head of the fixed projection when the rod is pushed inwards against the action of the said spring, and a formation on each of the said jaws intermediate between the pivot and the tooth-like portion adapted to be engaged by the said formation on the inner end of the rod when the latter is moved inwards to move apart the jaws to disengage the reduced part of the fixed projection.

2. In a fastening device for detachably connecting together two relatively movable parts of the type comprising a fixed projection mounted on the first of the two parts, a head with a reduced part behind it at the end of this fixed projection, and two similar jaws mounted on the second of the two parts, each jaw being pivoted at one end and having a tooth-like portion on the other end adapted first to pass over the head and then automatically to engage the reduced part of the fixed projection when the said two relatively movable parts are brought together; the combination of a rod which passes longitudinally through and which can slide in the said fixed projection, a spring operative to cause sliding of the rod in the outward direction, a formation on the inner end of the rod which extends beyond the head of the fixed projection when the rod is pushed inwards against the action of the said spring, a recess in the head of the fixed projection adapted to receive the formation on the end of the rod, the head and the formation together forming a bullet-shaped body when the formation lies in the said recess, and a formation on each of the said jaws intermediate between the pivot and the tooth-like portion adapted to be engaged by the said formation on the inner end of the rod when the latter is moved inwards to move apart the jaws to disengage the reduced part of the fixed projection.

3. A fastening device comprising the parts set out in claim 1 comprising in the combination a lever pivoted at one end and with its other end engaging the outer end of the said rod which slides within the said fixed projection, and a spring-actuated push button operative on the said lever at a point intermediate in its length whereby pressure can be applied to the lever and through it the said rod can be caused to slide in the said fixed projection and the fastening thereby released.

HERBERT OWEN SPILLER.

REFERENCES CITED

The following references are of record in the file of this patent:

UNITED STATES PATENTS

| Number | Name | Date |
| --- | --- | --- |
| 267,168 | Dudley | Nov. 7, 1882 |
| 789,775 | Ward | May 16, 1905 |

FOREIGN PATENTS

| Number | Country | Date |
| --- | --- | --- |
| 10,599 | Great Britain | Apr. 29, 1914 |
| 76,505 | Sweden | Feb. 14, 1933 |